United States Patent
Liu et al.

(10) Patent No.: US 9,311,542 B2
(45) Date of Patent: Apr. 12, 2016

(54) METHOD AND APPARATUS FOR DETECTING CONTINUOUS ROAD PARTITION

(71) Applicants: Dianchao Liu, Beijing (CN); Yuan Liu, Beijing (CN); Tong Liu, Beijing (CN); Zhongchao Shi, Beijing (CN); Gang Wang, Beijing (CN)

(72) Inventors: Dianchao Liu, Beijing (CN); Yuan Liu, Beijing (CN); Tong Liu, Beijing (CN); Zhongchao Shi, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 239 days.

(21) Appl. No.: 14/025,008

(22) Filed: Sep. 12, 2013

(65) Prior Publication Data
US 2014/0086451 A1    Mar. 27, 2014

(30) Foreign Application Priority Data

Sep. 24, 2012 (CN) .......................... 2012 1 0360018

(51) Int. Cl.
*G06K 9/00*    (2006.01)
(52) U.S. Cl.
CPC ........ *G06K 9/00798* (2013.01); *G06K 9/00791* (2013.01)
(58) Field of Classification Search
None
See application file for complete search history.

(56) References Cited

U.S. PATENT DOCUMENTS

2012/0114250 A1    5/2012    Zhong et al.

OTHER PUBLICATIONS

Chung-Hee Lee; Young-Chul Lim; Soon Kwon; Jong-Hun Lee, "Obstacle localization with a binarized v-disparity map using local maximum frequency values in stereo vision", 2008 2nd International Conference on Signals, Circuits and Systems (SCS): 4 . IEEE. (2008).*
Teutsch, Michael; Schamm, Thomas. "Fast Line and Object Segmentation in Noisy and Cluttered Environments using Relative Connectivity". Proceedings of the 2011 International Conference on Image Processing, Computer Vision, & Pattern Recognition (IPCV 2011): 517-23;1108. CSREA Press. (2011).*
"Vehicle and Guard Rail Detection Using Radar and Vision Data Fusion", Giancarlo Alessandretti, Alberto Broggi, and Pietro Cerri, et al., IEEE 2007 Transactions on Intelligent Transportation Systems.
"Lane Tracking in Hough Space Using Kalman Filter", Kyuhyoung Choi, Kyungwon Min, Sungchul Lee, Wonki Park, Yongduek Seo and Yousik Hong.

\* cited by examiner

*Primary Examiner* — Atiba O Fitzpatrick
(74) *Attorney, Agent, or Firm* — Harness, Dickey & Pierce, P.L.C.

(57) ABSTRACT

A method and an apparatus for detecting a continuous road partition with a height that includes obtaining disparity maps having the continuous road partition, and U-disparity maps corresponding to the disparity maps; obtaining an intermediate detection result of the continuous road partition detected from the U-disparity maps of first N frames; and detecting the continuous road partition from the U-disparity map of a current frame, based on the obtained intermediate detection result.

10 Claims, 5 Drawing Sheets

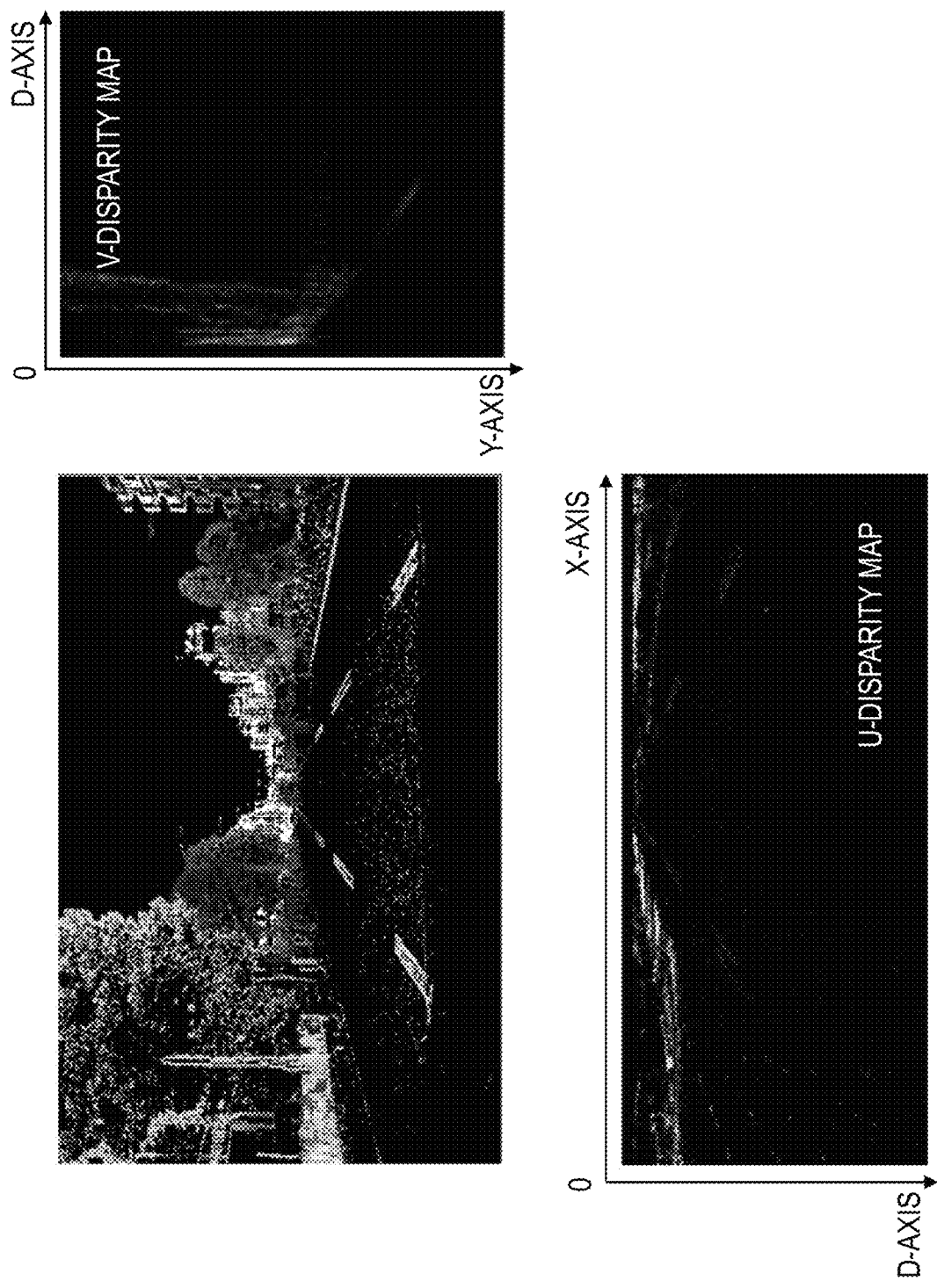

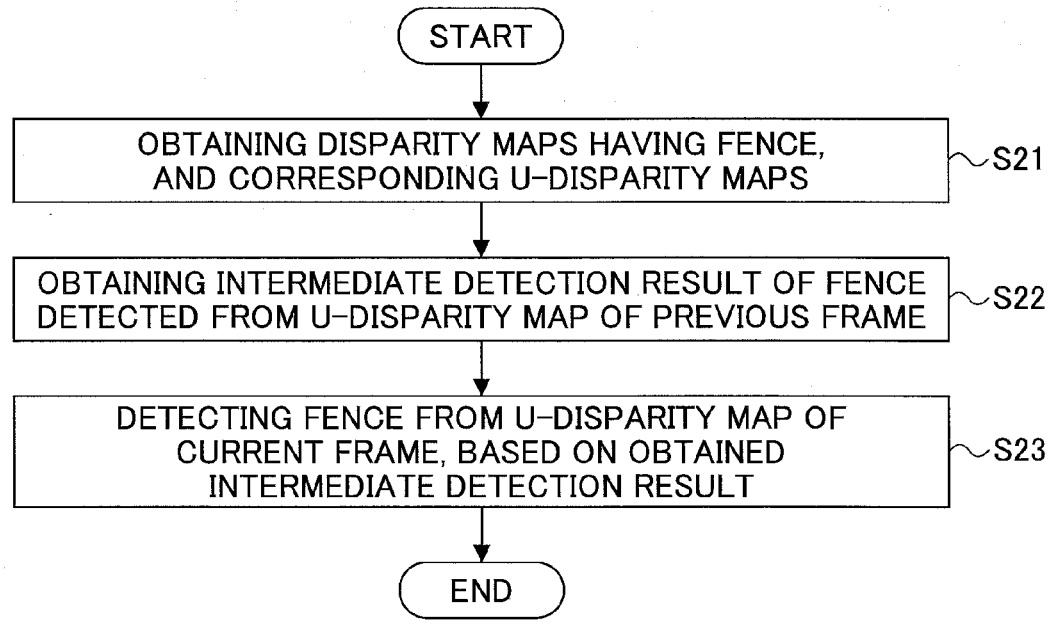
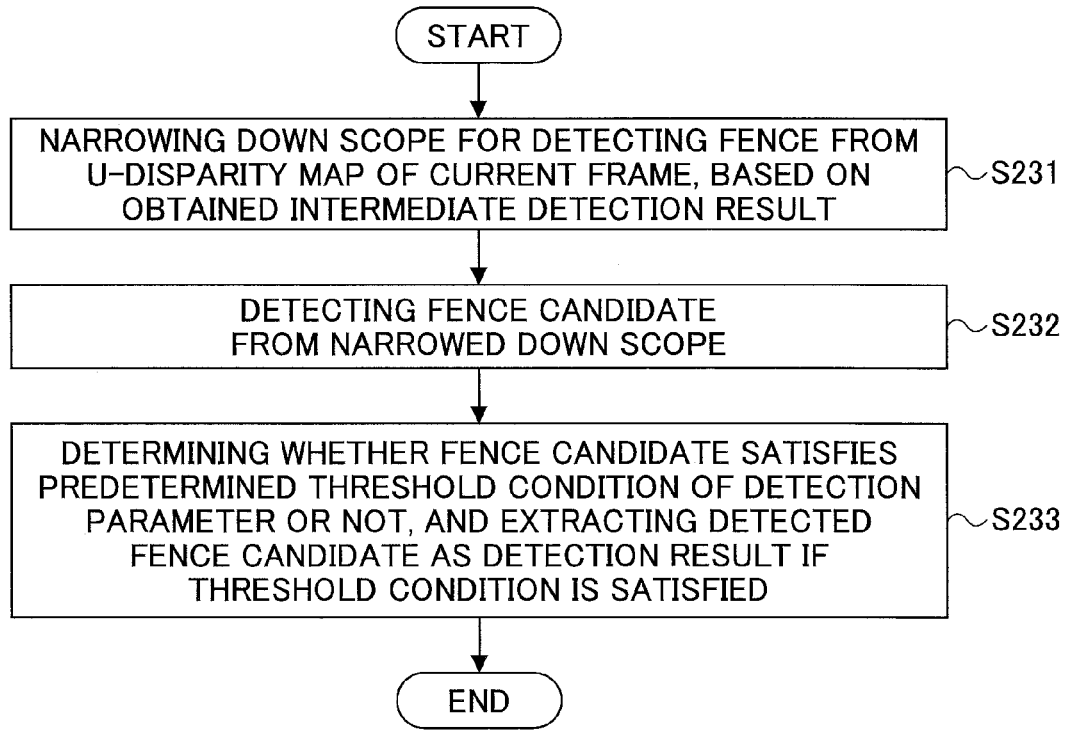

METHOD AND APPARATUS FOR DETECTING CONTINUOUS ROAD PARTITION

BACKGROUND OF THE INVENTION

1. Field of the Invention

The present invention generally relates to image processing, and specifically, a method and an apparatus for detecting a continuous road partition with a height.

2. Description of the Related Art

The driving assistance system is becoming more popular. The LDW/RDW (Lane/Road detection warning) system, a subsystem of the driving assistance system, can avoid collisions and help to determine driving directions accurately. A road or lane detection is very important for the LDW/RDW system, because only by knowing road information can a further process such as warning be performed. In general, a road or a lane is detected by detecting road partitions.

The road partitions include road shoulders, white lines, fences and other objects by which a road area and lanes can be identified. In the road partitions, there are continuous road partitions with a certain height such as fences, bushes and road shoulders.

With respect to the continuous road partitions, some detection methods have been disclosed.

For example, in the non-patent document 1 ("Vehicle and Guard Rail Detection Using Radar and Vision Data Fusion", Giancarlo Alessandretti, Alberto Broggi, and Pietro Cerri, et al., IEEE 2007 TRANSACTIONS ON INTELLIGENT TRANSPORTATION SYSTEMS), a method for detecting a vehicle and a fence input by a combination of radar imaging and vision imaging is disclosed. The radar image assistance provides the material information which cannot be obtained from a gray scale image, so that the radar image assistance is helpful for realizing the detection of the vehicle and the fences. However, in this method, it is difficult to obtain a stable result in practical application and the computation amount is also very large, because of the change of environmental conditions and the visual geometrical distortion.

Therefore, there is a demand for providing a technology for detecting a continuous road partition with a height which has stability and accuracy, so that a high detection rate can be obtained even in a complex environment and the computation amount can be reduced remarkably.

SUMMARY OF THE INVENTION

According to an aspect of the present invention, a method for detecting a continuous road partition with a height comprises the steps of: obtaining disparity maps having the continuous road partition, and U-disparity maps corresponding to the disparity maps; obtaining an intermediate detection result of the continuous road partition detected from the U-disparity maps of first N frames; and detecting the continuous road partition from the U-disparity map of a current frame, based on the obtained intermediate detection result.

According to another aspect of the present invention, an apparatus for detecting a continuous road partition with a height comprises: an image obtaining unit configured to obtain disparity maps having the continuous road partition, and U-disparity maps corresponding to the disparity maps; an intermediate detection result obtaining unit configured to obtain an intermediate detection result of the continuous road partition detected from the U-disparity maps of first N frames; and a detecting unit configured to detect the continuous road partition from the U-disparity map of a current frame, based on the obtained intermediate detection result.

According to the method and the apparatus for detecting the continuous road partition with a height according to the embodiment of the present invention, the continuous road partition is detected from the U-disparity map of the current frame, by tracking, obtaining and using the intermediate detection result detected from the U-disparity maps of historical frames; therefore, the computation amount can be reduced remarkably, accuracy of the detection can be improved, and efficiency of the detection can be improved.

BRIEF DESCRIPTION OF THE DRAWINGS

FIG. 1 is a schematic drawing illustrating a disparity map having a fence part, and corresponding U-disparity and V-disparity maps;

FIG. 2 is an overall flowchart illustrating a fence detecting method according to the first embodiment of the present invention;

FIG. 3 is a sub flowchart illustrating the fence detecting method according to the first embodiment of the present invention;

DETAILED DESCRIPTION OF THE PREFERRED EMBODIMENTS

Figure 4:
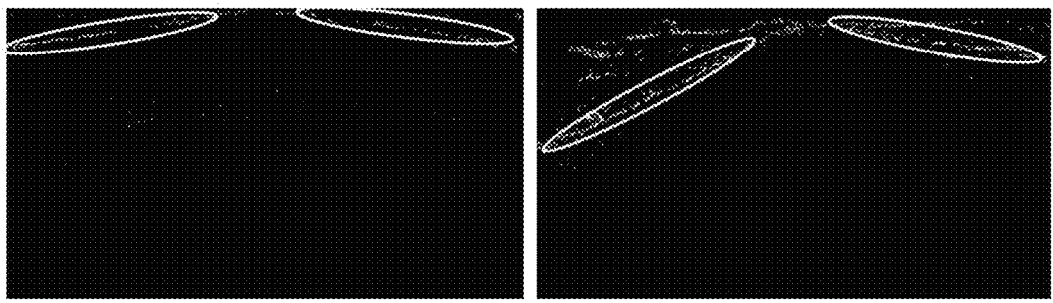
FIG. 4 is a schematic drawing illustrating the fence within the U-disparity map.

In the following, embodiments of the present invention are described with reference to the accompanying drawings, so as to facilitate the understanding of the present invention.

In the embodiments of the present invention, concepts of "disparity", "disparity map", "V-disparity map" and "U-disparity map" are used. These concepts are well-known in the art, therefore these concepts will be briefly introduced as follows.

"Disparity" indicates an angle made by two straight lines that are drawn from opposite ends of a base line to a distant object. In general, it means a direction difference generated by looking at the same object from two points having a certain separation distance. The angle that is generated by looking at the two points from the object is called a disparity angle of the two points, and the distance between the two points is called a base line. A distance between the object and an observer can be calculated as long as the disparity angle and length of the base line are known.

"Disparity map" is an image that is based on a reference image, the size of the disparity, and the size of the reference image; and an element value of the disparity map is a disparity value. The disparity map includes distance information of a scene. The disparity map may be calculated from left and right images picked up by a binocular camera, be calculated from images picked up by a multiple camera or a stereo camera, or be calculated from a depth map of a stereogram.

The coordinates of a point of a reference image may be represented as (x,y), where x is abscissa and y is ordinate. In the two-dimensional disparity map obtained by converting the reference image, the coordinates of a point corresponding to the point (x,y) may be represented as (u,v), where u is abscissa, v is ordinate, u=x and v=y. The gray value of each of points within the disparity map is the disparity of the point, and is represented as d. Alternatively, the point within the disparity map may be represented as (u,v,d) so as to reflect the coordinates and the disparity of the point simultaneously.

The V-disparity map and the U-disparity map may be derived from the disparity map. The V-disparity looks like a side view of the original three-dimensional scene, where the abscissa axis is d axis, the ordinate axis is v axis, the point may be represented as (d,v), and the gray value (brightness value) of the point (d,v) is the number of the points of the corresponding disparity map where the ordinate is v and the disparity value is equal to d. Therefore, the V-disparity map may be derived from the disparity map by the statistics of the numbers or other methods in the art. The U-disparity looks like a top view of the original three-dimensional scene, where the abscissa axis is u axis, the ordinate axis is d axis, the point may be represented as (u,d), and the gray value (brightness value) of the point (u,d) is the number of the points of the corresponding disparity map where the abscissa is u and the disparity value is equal to d. Therefore, the U-disparity map may be derived from the disparity map by the statistics of the numbers or other methods in the art. FIG. 1 is a schematic drawing illustrating a disparity map having a fence part, and corresponding U-disparity and V-disparity maps.

The detection method according to the embodiments of the present invention may be applied to any continuous road partition with a height. The continuous road partition with a height means an object that has a height on the basis of the ground and has a function for partitioning the road along the direction where the road extends, such as fences of the roadside, bushes and road shoulders. It should be noted that, the height of the object may not be constant or the same height. In the following, the method for detecting the continuous road partition with a height according to the embodiments of the present invention will be described by using the fence as an example.

<The First Embodiment>

FIG. 2 is an overall flowchart illustrating a fence detecting method according to the first embodiment of the present invention.

As illustrated in FIG. 2, in step S21, disparity maps having the continuous road partition, and U-disparity maps corresponding to the disparity maps are obtained.

Any existing method for obtaining the disparity map may be applied to the present invention. For example, the disparity map having a fence may be obtained by picking up images by a binocular camera, a multi-camera or a stereo camera and calculating. Specifically, left and right images may be picked up by a binocular camera and the disparity map may be calculated from the left and right images. Or a depth map may be obtained from a stereogram, and the disparity map may be obtained from the depth map. After obtaining the disparity map, the corresponding U-disparity map and V-disparity map are obtained by converting from the disparity map.

In step S22, an intermediate detection result of the continuous road partition detected from the U-disparity maps of the first N frames is obtained.

In general, the fence extends in a straight line form and is expressed as a straight line in the U-disparity map, therefore the fence can be detected by detecting a straight line from the U-disparity map. Specifically, straight lines may be detected from the U-disparity map by various methods for detecting the straight line to position the fence, the detected straight lines are filtered by a predetermined detection parameter, and the final detection result is obtained. Of course, there are various methods for detecting straight lines from the image, and a Hough transform will be described as an example as follows.

The Hough transform is a conventional method for detecting a straight from an image. The straight line y=kx+b in the rectangular coordinate system may be represented as r=x·cos θ+y·sin θ, where r indicates the distance between the straight line and the origin and θ indicates the angle between the straight line and the X axis. Thus, for an arbitrary point with coordinates (x0,y0), the lines that go through the point satisfy r(θ)=x0·cos θ+y0·sin θ. In cases where the straight lines are detected by the Hough transform, the set of the straight lines that go through a point and are represented as (r,θ) is determined by the points within the image (that is, values r corresponding to angles θ sampled at a certain angle interval in the range from 0° to 360° are calculated), the coordinates of the set of the straight lines that go through a point form a curved line in the Hough space, and the intersection of a plurality of curved line in the Hough space represents a straight line formed by the points. In general, the intersection formed by most curved lines represents the detected line.

In detection of the fence in continuous video signals, as a basic method, the straight lines are detected independently from the U-disparity map of each frame so as to determine the position of the fence, namely, a detection of the U-disparity map of the current frame is performed, without referring to the parameters of the straight lines detected from the U-disparity map of the historical frames; or a detection of the U-disparity map of the current frame is performed by only referring to the final detection result of the historical frames. Obviously, in these detection methods, the detection efficiency is low and the calculation amount is large.

As described above, since the fence usually extends in a continuous straight line form, the change of angles θ of the straight lines detected from the U-disparity maps of several adjacent frames is almost none, when the detected straight lines are converted by the Hough transform. Therefore, the angle θ of the straight line detected from the U-disparity map of the previous frame may be tracked and used so as to reduce the calculation amount for the detection of the current frame, when the straight line is detected from the U-disparity map of the current frame.

In step S23, the continuous road partition is detected from the U-disparity map of the current frame, based on the obtained intermediate detection result.

In this step, straight lines are detected from the U-disparity map of the previous frame by the Hough transform similarly to position the fence based on the intermediate detection result, the detected straight lines are filtered by a predetermined detection parameter, and the final detection result is obtained. FIG. 3 is a flowchart illustrating the operation process. In the following, the operation will be described in detail with reference to FIG. 3.

In step S231, a scope for detecting the continuous road partition from the U-disparity map of the current frame is narrowed down, based on the intermediate detection result. Specifically, in the current frame, the values r are calculated by sampling the corresponding angle θ of the straight line at a certain angle interval only in a peripheral range (namely, in a range of +/−Δ°) of the straight line detected from the U-disparity map of the previous frame in step S220, namely, the Hough space for detecting the straight line is narrowed down; therefore, the calculation amount can be reduced.

In step S232, a continuous road partition candidate is detected from the narrowed down scope. Specifically, for example, when the straight lines are detected by the Hough transform, a point with a peak value, namely, the intersection where the most curved lines intersect, is determined from the narrowed down Hough space. In this way, the straight line represented by the point with the peak value is obtained.

In step S233, it is determined whether the continuous road partition candidate meets a condition of a threshold of a predetermined detection parameter or not, and the detected continuous road partition candidate is extracted as a detection result if the threshold condition is met. The detection parameter and its threshold condition are used to reflect the characteristics of the target fence, and may be predetermined according to specific situations and requirements. For example, the threshold condition may be any appropriate conditions such as a threshold of the number of points on the straight line (for example, 250 points), a threshold of the length of the detected line (for example, the length corresponding to 250 pixels), or a threshold of the interval length on the formed line (for example, 40 pixels). The detected fence is regarded as a correct detection result only if it meets the threshold condition.

In the above description, only the angle θ of the straight line detected from the U-disparity map of the previous one frame is tracked and used, when the fence is detected from the U-disparity map of the current frame. Actually, the angles θ of the straight lines detected from the U-disparity maps of the first N frames may also be tracked and used, to perform the detection of the U-disparity map of the current frame. For example, N angles θ corresponding to the U-disparity maps of the first N frames may be obtained, respectively, in step S22, and the angle θ that is used in step S23 may be determined by any appropriate method such as average value of the weight or the simple average. In step S23, the fence is detected from the U-disparity map of the current frame by the determined angle θ.

The fence detecting method according to the embodiment of the present invention by using the Hough transform as an example, is described above. In actual practice, the straight lines may also be detected from the U-disparity map by other various line detecting methods to position the fence. Obviously, the corresponding detection parameter may be tracked and used similarly when the line detecting methods other than the Hough transform is used.

According to the detection method according to the first embodiment of the present invention, the fence is detected from the U-disparity map of the current frame, by tracking, obtaining and using the intermediate detection result of the fences detected from the U-disparity maps of the first N frames. Therefore, the computation amount can be reduced remarkably, accuracy of the detection can be improved, and efficiency of the detection can be improved.

<The Second Embodiment>

In the first embodiment, the calculation amount of the detection of the current frame is reduced and the detection efficiency is improved by tracking, obtaining and using the intermediate detection result of the U-disparity maps of the historical frames. In the second embodiment, the threshold condition of the detection parameter is tracked and adjusted self-adaptively, therefore the detection efficiency is further improved, and robustness and adaptability of the object detection are also enhanced.

As described above, the detection parameter and its threshold condition are used to reflect the characteristics of the target fence, and may be predetermined according to specific situations and requirements. Usually, there are two kinds of the detection parameters of the straight lines. One is a basic parameter such as a minimum line length or a maximum interval length, which almost does not change by road conditions and fence features; and the other one is a special parameter such as the number of pixels on the line, the density of pixels on the line or the permissible error of pixels on the line, which is affected by environmental conditions such as illuminance and weather, and changes more easily than the basic parameter. Both kinds of parameters can be tracked, and be adjusted self-adaptively based on the information of the current frame (such as the number of the pixels in the histogram or the U-disparity map) or the thresholds of the detection parameters used in the historical frames and the current frame, so as to adapt various environmental changes and improve accuracy rate and efficiency of the detection.

Both of the meaning of the detection parameter and the threshold conditions, and how to select appropriate detection parameters and set the threshold conditions, are well known to those skilled in the art. In the following, the minimum line length, the maximum interval length, the number of the pixels on the line, the density of the pixels on the line and the permissible error of the pixels on the line will be briefly described, so as to facilitate the understanding of the present invention.

The minimum line length is a requirement for the length of the detected straight line. The detected straight line may be retained as the detection result, if the length of the detected straight line reaches the threshold.

Since the target fence might not be always continuous, the straight line that represents the fence might be intermittent, and the chance to detect the perfect target object can be increased if the intermittency is permitted to some extent. Therefore, the maximum interval length is used to represent a maximum length by which an interval is permitted on the straight line.

The density of pixels on the line is an important parameter. It is regarded that there are sufficient points on the line and the straight line is valid, if the density of the points on the detected straight line is greater than the threshold; otherwise, the density is too low and the straight line is invalid, that is, cannot be used as the detection result.

The number of pixels on the line is similar to the density of pixels on the line. It is regarded that there are sufficient points on the line and the straight line is valid, if the number of the points on the detected straight line is greater than the threshold; otherwise, the number of the points is too few and the straight line is invalid, that is, cannot be used as the detection result.

Since the distribution of the points is dispersed, the points might not be located in a straight line accurately. Therefore, more points can be made to be located in the line and the chance to detect a complete target object will be increased, if a distance error is permitted to some extent. The permissible error of pixels on the line is a detection parameter for reflecting this feature. It is regarded that a point is located in the straight line, if the distance from the point to the line is less than the predetermined threshold of the parameter. For example, as an example of the straight line detection by the Hough transform, the coordinates of the set of the straight lines that go through a point can form a curved line in the Hough space, and the intersection of a plurality of the curved lines in the Hough space represents a straight line formed by the corresponding points as described above. The peak shape of the intersection of a plurality of corresponding curved lines in the Hough space is sharp (clear), namely, the intersection is an accurate point, if a plurality of points are located in a straight line exactly. On the other hand, the peak shape of the intersection may be gentle, namely, the intersection is not an accurate point but a small area if points are not located in a straight line exactly; at this time, it is necessary to set the permissible error of the points on the line. Specifically, the more gentle the peak shape of the intersection is, the bigger the permissible error of the points on the line may be set.

Obviously, the detection parameter is not limited to the above examples, but may be set as any appropriate detection parameter according to the specific environment.

The fence detecting method according to the second embodiment is different from the method according to the first embodiment only in step S232. Specifically, in step S232', the threshold of the detection parameter is adjusted and a continuous road partition candidate is detected from the narrowed down scope, if the number of pixels that are capable of forming the fence in the narrowed down scope is too low.

For example, since the picked up original three-dimensional scene image is affected by environmental factors such as varying weather, time and scenes, a fixed threshold has a lot of limitations. For example, the light exposure is low because the illuminance in a time period is weak, so that the number of the pixels that are capable of forming the fence in the U-disparity map of the current frame becomes too low (for example, it less than a threshold), and the straight line detected from the U-disparity map does not meet the above threshold condition of the detection parameter. In this case, the requirement of the parameter for the detected straight line may be reduced by adjusting the threshold of the detection parameter, so that a detection result that meets the threshold condition of the detection parameter can be obtained in subsequent step S233. For example, the above minimum line length, the number of pixels on the line or the density of pixels on the line may be reduced, the maximum interval length or the threshold of the permissible error of pixels on the line may also be increased, if the number of the pixels that are capable of forming the fence in the U-disparity map of the current frame is too low. The leakage of the detection can be reduced and the detection efficiency can be improved by adjusting the detection parameter self-adaptively. It should be noted that, an adjustment of the threshold of the detection parameter opposite to the above adjustment may also be performed, if the number of the pixels that are capable of forming the fence in the U-disparity map of the current frame is too many; so that, the parameter requirement of the detected straight is improved and the accuracy of the detection is improved.

As described above, the threshold of the detection parameter applied in the U-disparity map of the current frame is adjusted self-adaptively based on the information of the U-disparity map of the current frame. It should be noted that, in the second embodiment, the detection parameter may be adjusted self-adaptively based on the information features of the U-disparity maps of the historical frames and the current frame so as to increase robustness and adaptability of the object detection.

For example, if the obtained image quality is affected by the exposure variation because of a sudden environmental factor such as reflection, a large adjustment of the threshold of the detection parameter will be performed; however, the sudden environmental factor that causes the exposure variation may disappear in the next frame, namely, the environmental factor may recover to an environmental factor with which the U-disparity maps of the historical frames are formed. As another example, a large adjustment of the detection parameter may be performed incorrectly when the fence is detected from the U-disparity map of the current frame. Obviously, the large adjustment of the detection parameter at this time is not suitable for the U-disparity map of the subsequent frames. In order to solve this problem, the thresholds of the detection parameters applied to the U-disparity map of the current frame and at least the U-disparity map of the previous frame may be tracked and the threshold of the detection parameter to be applied to the U-disparity map of the next frame may be adjusted according the tracked thresholds so as to avoid the problem of a temporary minimum value, after step S23 of the detection method described in the first embodiment.

For example, assuming that the current frame is t, with respect to the above detection parameters, the thresholds of the detection parameters used in the t+1 frame may be adjusted according to the following equation.

$$\text{minimum line length: length}(t+1) = F(\text{length}(t), \text{length}(t-1), \text{length}(t-2), \ldots)$$

$$\text{maximum interval length: gap}(t+1) = F(\text{gap}(t), \text{gap}(t-1), \text{gap}(t-2), \ldots)$$

$$\text{number of pixels on the line: numinline}(t+1) = F(\text{numinline}(t), \text{numinline}(t-1), \text{numinline}(t-2), \ldots)$$

$$\text{density of pixels on the line: density}(t+1) = F(\text{density}(t), \text{density}(t-1), \text{density}(t-2), \ldots)$$

$$\text{permissible error of pixels on the line: bias}(t+1) = F(\text{bias}(t), \text{bias}(t-1), \text{bias}(t-2), \quad (1)$$

Where F( . . . ) may be any algorithm for the track adjustment, for example, a simple averaging method may be used for the consideration of the process speed. As illustrated in the above equation, the adjustment can be performed based on the detection parameters of the current frame and N historical frames, where N>1 and specific values may be set appropriately by the user according to the specific situation.

In the detection method according to the second embodiment of the present invention, the thresholds of the detection parameters applied in the U-disparity map of the current frame are adjusted self-adaptively based on the information of the U-disparity map of the current frame, and the information of the U-disparity maps of the current frame and the historical frames are tracked and obtained so as to adjust the threshold of the detection parameter applied in the U-disparity map of the next frame self-adaptively. Therefore, the detection efficiency is further improved, and robustness and adaptability of the object detection is also enhanced, based on the self-adaptive adjustment.

<The Third Embodiment>

The fence detecting method according to the third embodiment is the same as the methods according to the first and second embodiments basically, and they are different only in that step S230 (not shown in drawings) before step S231 is further comprised. In step S230, a region of interest having the continuous road partition is determined from the U-disparity map of the current frame. That is, in the third embodiment, the detection is performed not in the whole U-disparity map having the fence, but in the region of interest of the whole U-disparity map.

Figure 5:
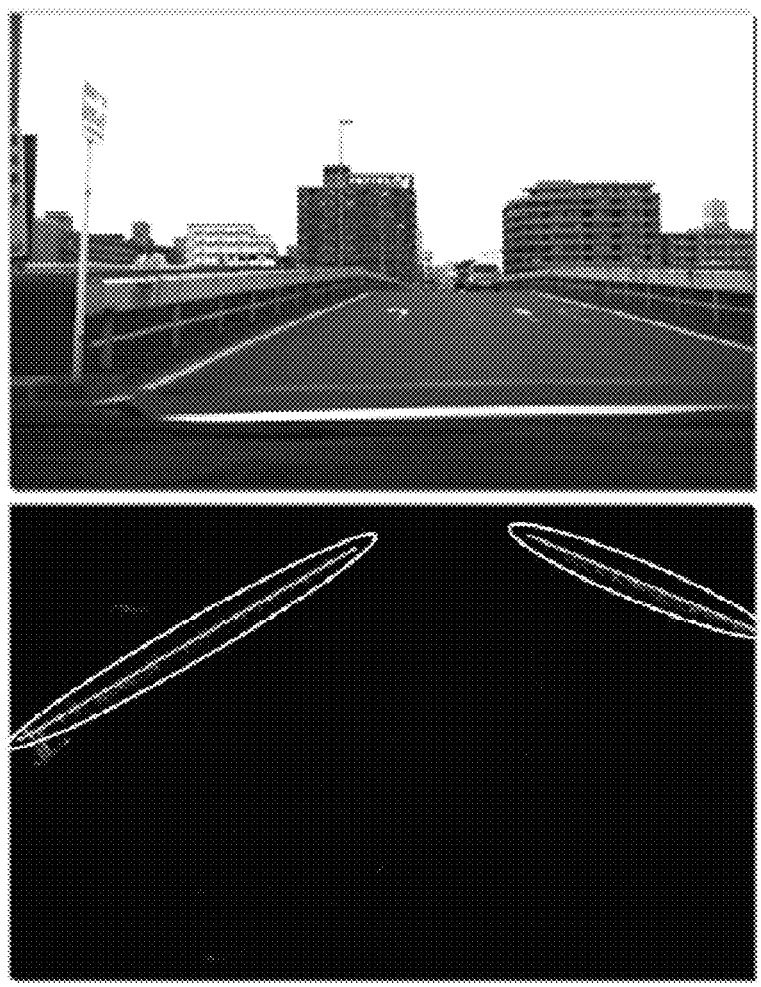
FIG. 5 is another schematic drawing illustrating the fence within the U-disparity map.

The region of interest is usually determined from experimental results or historical experience. For example, as a result after observing the positions of many fences located in the U-disparity map, the angle of the left fence is usually between 30° and 45°, as illustrated in FIGS. 4 and 5. Accordingly, the region of interest of the U-disparity map that has the fence (namely, the region with an angle is between 30° and 45°) can be determined; therefore, the detection efficiency can be improved and the calculation time can be reduced by performing the detection only in the region of interest. Similarly, the region of interest within the U-disparity map may be determined based on the position or length range of the fence.

<Variation>

The fence detecting method according to the embodiment of the present invention is described above, and some variations of the detection method are described below.

In the above embodiments, the method for detecting the fence from the U-disparity map is described. As described above, the method for obtaining the U-disparity map is well known, and the road is almost the lowest surface of the detected whole original three-dimensional scene; therefore, the U-disparity map is usually a U-disparity map consisting of disparity points within the original disparity map that are located in the road. However, in a variation of the present invention, the U-disparity map is a U-disparity map consisting of disparity points within the original disparity map that are located in a section parallel to a road.

If objects within a three-dimensional world are cut by a section (slice) parallel to the ground in the three-dimensional world corresponding to the disparity map, all of the points of the objects that intersect are located in the same plane parallel to the ground; therefore, the section can only intersect the objects with a height within a range by selecting the height of the section properly. For example, in cases where a fence is detected, the section is selected within a value range of a general fence height, thereby making the section not intersect white lines, roadside stones and buildings on the top; therefore, the interference by these objects can be avoided and the information of the section for processing may be greatly reduced; as a result, the calculation amount of the detection can be reduced and the detection efficiency can be improved.

Figure 6:
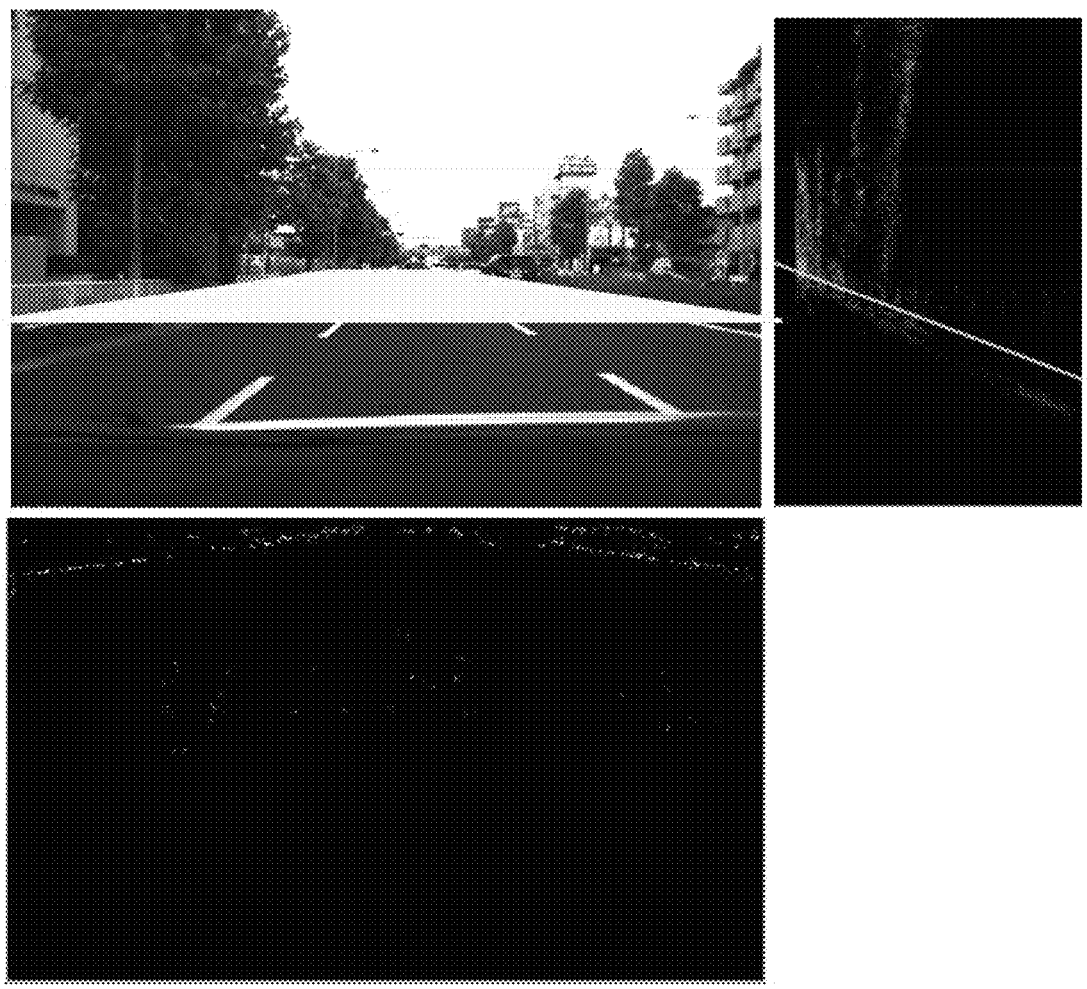
FIG. 6 is a schematic drawing illustrating a section parallel to the ground in the disparity map, a V-disparity map consisting of disparity points within the disparity map that are located in the section, and a U-disparity map consisting of disparity points within the disparity map that are located in the section.

The upper-left drawing of FIG. 6 illustrates a section parallel to the ground in the disparity map, as illustrated by the gray part; the upper-right drawing of FIG. 6 illustrates a V-disparity map consisting of disparity points within the disparity map that are located in the section, where the straight lines within the V-disparity map correspond to the horizontal sections within the disparity map; and the lower-left drawing of FIG. 6 illustrates a U-disparity map consisting of disparity points within the disparity map that are located in the section, where the fence seems similar to a straight line.

In order to obtain the U-disparity map consisting of the disparity points within the disparity map that are located in the section, various existing methods may be used. For example, the method described in the invention disclosed by the Chinese Patent Application 201210147642.5 by the present applicant may be used.

In the above embodiments, the detected fence is a straight line type; however the present invention is not limited to this. In anther variation of the present invention, a curved fence along the curve of the road may be detected.

Specifically, a plurality of continuous line segments with different slopes may be detected from a U-disparity map having a curved fence, and a curved line may be obtained by fitting the line segments, so that the curved fence can be detected.

In the method according to the embodiments of the present invention, the fence is described as an example; however, the method of the present invention may be applied to the detection of any continuous road partition with a height as described above.

<Overall Configuration of the Apparatus for Detecting the Continuous Road Partition with a Height>

Figure 7:
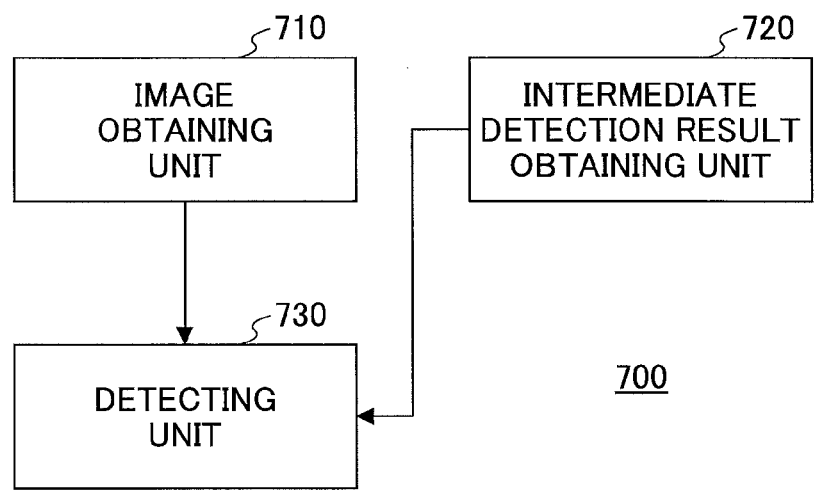
FIG. 7 is a block diagram illustrating an overall configuration of the apparatus for detecting the continuous road partition with a height according to one embodiment of the present invention.

FIG. 7 is a block diagram illustrating an overall configuration of the apparatus for detecting the continuous road partition with a height according to one embodiment of the present invention.

As illustrated in FIG. 7, the apparatus for detecting a continuous road partition with a height 700 comprises: an image obtaining unit 710 configured to obtain disparity maps having the continuous road partition, and U-disparity maps corresponding to the disparity maps; an intermediate detection result obtaining unit 720 configured to obtain an intermediate detection result of the continuous road partition detected from the U-disparity maps of the first N frames; and a detecting unit 730 configured to detect the continuous road partition from the U-disparity map of the current frame, based on the obtained intermediate detection result.

Although it is not illustrated in FIG. 7, the apparatus for detecting a continuous road partition with a height 700 may further comprise a detection parameter adjusting unit for tracking the threshold of the detection parameter applied to the U-disparity map of the current frame and at least the U-disparity map of the previous frame, and adjusting the threshold of the detection parameter to be applied to the U-disparity map of the next frame.

Furthermore, although it is not illustrated in FIG. 7, the detecting unit 730 may further comprise, for example, a scope determining unit for narrowing down a scope for detecting the continuous road partition from the U-disparity map of the current frame, based on the intermediate detection result; an object candidate detecting unit for detecting a continuous road partition candidate from the narrowed down scope; and a detection result determining unit for determining whether the continuous road partition candidate meets a condition of a threshold of a predetermined detection parameter or not, and extracting the detected continuous road partition candidate as a detection result if the threshold condition is met.

<System Hardware Configuration>

Figure 8:
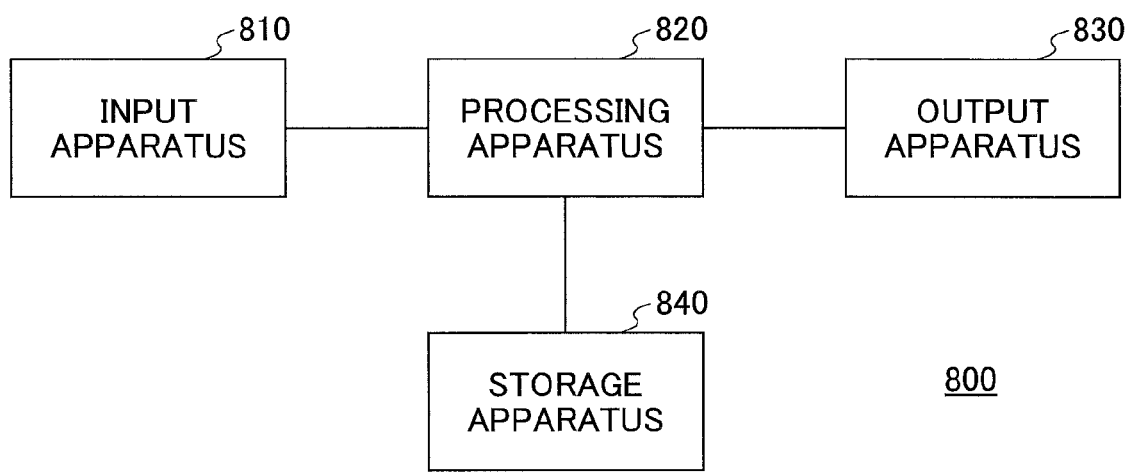
FIG. 8 is an overall hardware block diagram illustrating a system for detecting the continuous road partition with a height according to the embodiment of the present invention.

The present invention may be implemented as a system for detecting the continuous road partition with a height. FIG. 8 is an overall hardware block diagram illustrating a system for detecting the continuous road partition with a height according to the embodiment of the present invention. As illustrated in FIG. 8, the system for determining the continuous road partition with a height 800 may comprise: an input apparatus 810 for inputting relevant images or information such as left and right images picked up by a stereoscopic camera, depth information, or a disparity map of a continuous road partition part, for example, including a keyboard, a mouse, and a communication network and an input device connected thereto, etc.; a processing apparatus 820 for implementing the above method for detecting the continuous road partition with a height according to the embodiment of the present invention or being implemented as the above apparatus for detecting the continuous road partition with a height according to the embodiment of the present invention, such as CPU of a computer or other chips having processing ability, etc., that can be connected to a network (not shown) such as the Internet and transmit a processed image to a remote apparatus based on the requirement of processing procedure; an output apparatus 830 for outputting the result obtained by implementing the continuous road partition detection to the outside, such as a screen, a printer, a communication network and a remote output device connected thereto, etc.; and a storage apparatus 840 for storing images or information such as an image, a disparity map, a U-disparity map and a V-disparity map, an intermediate detection result, a detection parameter and its threshold, etc., by a volatile method or a nonvolatile method, such as various kinds of volatile or nonvolatile memory including a random-access memory (RAM), a read-only memory (ROM), a hard disk and a semiconductor memory.

The basic principle of the present invention is described above with reference to the embodiments. Any one or all of the steps or units of the method or apparatus according to the present invention may be implemented by hardware, firmware, software or their combination in any one of computing devices (including a processor, a storage medium, etc.) or a network of computing devices, and it can be implemented by persons skilled in the art who have read the specification of the present application.

Therefore, the present invention can also be realized by a program or a set of programs running on any one of computing devices. The computing devices may be well known general-purpose devices. Therefore, the present invention may also be implemented by providing a program product including program codes for implementing the method or apparatus.

In addition, in the apparatus or method of the present invention, units or steps may be divided and/or recombined. The division and/or recombination should be regarded as an equivalent embodiment of the present invention. Steps of the above method may be performed in time order, however the performing sequence is not limited to the time order. Any steps may be performed in parallel or independently.

The present invention is not limited to the specifically disclosed embodiments, and various modifications and replacements may be made without departing from the scope of the present invention.

The present application is based on and claims the benefit of priority of Chinese Priority Application No. 201210360018.3 filed on Sep. 24, 2012, the entire contents of which are hereby incorporated by reference.

What is claimed is:

1. A method for detecting a continuous road partition with a height, comprising the steps of:
    obtaining disparity maps having the continuous road partition, and obtaining U-disparity maps derived from the disparity maps;
    obtaining an intermediate detection result of the continuous road partition detected from the U-disparity maps of a first frame; and
    detecting the continuous road partition from the U-disparity map of a current frame, based on the obtained intermediate detection result, wherein the step of detecting the continuous road partition from the U-disparity map of the current frame based on the obtained intermediate detection result further comprises the step of detecting a curved continuous road partition by detecting a plurality of continuous line segments with different slopes from the U-disparity map.

2. The method for detecting a continuous road partition with a height according to claim 1,
    wherein the U-disparity map is a U-disparity map consisting of disparity points within the disparity map that are located in a section parallel to a road within an original three-dimensional scene.

3. The method for detecting a continuous road partition with a height according to claim 1,
    wherein the step of detecting the continuous road partition from the U-disparity map of the current frame based on the obtained intermediate detection result further comprises the step of determining a region of interest having the continuous road partition from the U-disparity map of the current frame.

4. The method for detecting a continuous road partition according to claim 1, wherein a straight line representing the continuous road partition is detected from the U-disparity map by a Hough transform so that the continuous road partition is detected, and the intermediate detection result is a value $\theta$ that indicates the angle between the straight line representing the continuous road partition and the X axis.

5. The method for detecting a continuous road partition according to claim 1, wherein the step of detecting the continuous road partition from the U-disparity map of the current frame based on the obtained intermediate detection result further comprises the steps of
    narrowing down a scope for detecting the continuous road partition from the U-disparity map of the current frame, based on the intermediate detection result;
    detecting a continuous road partition candidate from the narrowed down scope; and
    determining whether the continuous road partition candidate meets a condition of a threshold of a predetermined detection parameter or not, and extracting the detected continuous road partition candidate as a detection result if the threshold condition is met.

6. A method for detecting a continuous road partition with a height, comprising the steps of:
    obtaining disparity maps having the continuous road partition, and obtaining U-disparity maps derived from the disparity maps;
    obtaining an intermediate detection result of the continuous road partition detected from the U-disparity maps of a first frame; and
    detecting the continuous road partition from the U-disparity map of a current frame, based on the obtained intermediate detection result, wherein the step of detecting the continuous road partition from the U-disparity map of the current frame based on the obtained intermediate detection result further comprises the steps of
    narrowing down a scope for detecting the continuous road partition from the U-disparity map of the current frame, based on the intermediate detection result;
    detecting a continuous road partition candidate from the narrowed down scope; and
    determining whether the continuous road partition candidate meets a condition of a threshold of a predetermined detection parameter or not, and extracting the detected continuous road partition candidate as a detection result if the threshold condition is met, and
    wherein the step of detecting a continuous road partition candidate from the narrowed down scope further comprises the step of adjusting the threshold of the detection parameter if the number of pixels that are capable of forming the continuous road partition in the narrowed down scope is too low.

7. A method for detecting a continuous road partition with a height, comprising the steps of:
    obtaining disparity maps having the continuous road partition, and obtaining U-disparity maps derived from the disparity maps;
    obtaining an intermediate detection result of the continuous road partition detected from the U-disparity maps of a first frame; and
    detecting the continuous road partition from the U-disparity map of a current frame, based on the obtained intermediate detection result, wherein the step of detecting the continuous road partition from the U-disparity map of the current frame based on the obtained intermediate detection result further comprises the steps of narrowing down a scope for detecting the continuous road partition from the U-disparity map of the current frame, based on the intermediate detection result;

detecting a continuous road partition candidate from the narrowed down scope; and determining whether the continuous road partition candidate meets a condition of a threshold of a predetermined detection parameter or not, and extracting the detected continuous road partition candidate as a detection result if the threshold condition is met, wherein the step of detecting a continuous road partition candidate from the narrowed down scope further comprises the step of adjusting the threshold of the detection parameter if the number of pixels that are capable of forming the continuous road partition in the narrowed down scope is too low, and tracking the thresholds of the detection parameters applied to the U-disparity map of the current frame and at least the U-disparity map of the previous frame, and adjusting the threshold of the detection parameter to be applied to the U-disparity map of the next frame.

8. A method for detecting a continuous road partition with a height, comprising the steps of:

obtaining disparity maps having the continuous road partition, and obtaining U-disparity maps derived from the disparity maps;

obtaining an intermediate detection result of the continuous road partition detected from the U-disparity maps of a first frame; and detecting the continuous road partition from the U-disparity map of a current frame, based on the obtained intermediate detection result, wherein the step of detecting the continuous road partition from the U-disparity map of the current frame based on the obtained intermediate detection result further comprises the steps of narrowing down a scope for detecting the continuous road partition from the U-disparity map of the current frame, based on the intermediate detection result;

detecting a continuous road partition candidate from the narrowed down scope; and determining whether the continuous road partition candidate meets a condition of a threshold of a predetermined detection parameter or not, and extracting the detected continuous road partition candidate as a detection result if the threshold condition is met, and wherein the predetermined detection parameter comprises at least one of a minimum line length of a line representing the continuous road partition, a maximum interval length on the line, the number of pixels on the line, the density of pixels on the line and the permissible error of pixels on the line.

9. An apparatus for detecting a continuous road partition with a height, comprising:

an image obtaining unit configured to obtain disparity maps having the continuous road partition, and obtain U-disparity maps derived from the disparity maps;

an intermediate detection result obtaining unit configured to obtain an intermediate detection result of the continuous road partition detected from the U-disparity maps of a first frame; and a detecting unit configured to detect the continuous road partition from the U-disparity map of a current frame, based on the obtained intermediate detection result, wherein the obtained intermediate detection result further comprises the step of detecting a curved continuous road partition by detecting a plurality of continuous line segments with different slopes from the U-disparity map.

10. The method for detecting a continuous road partition according to claim 1, wherein the step of narrowing includes sampling a corresponding angle$\theta$ of the straight line at a certain angle interval only in a peripheral range of the straight line detected from the U-disparity map of the previous frame.

* * * * *